United States Patent [19]

Schad

[11] Patent Number: 4,589,840
[45] Date of Patent: May 20, 1986

[54] APPARATUS AND METHOD FOR REMOVING MOLDED ARTICLES IN UNIFORM ORIENTATION

[75] Inventor: Robert D. Schad, Toronto, Canada

[73] Assignee: Husky Injection Molding Systems Ltd., Bolton, Canada

[21] Appl. No.: 712,520

[22] Filed: Mar. 18, 1985

[51] Int. Cl.$^4$ .............................................. B29C 45/40
[52] U.S. Cl. ...................................... 425/556; 264/334
[58] Field of Search .................. 425/554, 556; 264/334

[56] References Cited

U.S. PATENT DOCUMENTS

| | | | |
|---|---|---|---|
| 3,454,991 | 7/1969 | Rees | 425/169 |
| 3,700,375 | 10/1972 | Rees | 425/444 |
| 3,712,781 | 1/1973 | Schmier | 425/444 |
| 3,734,666 | 5/1973 | Guest et al. | 425/437 |
| 3,767,342 | 10/1973 | Potter et al. | 425/437 |
| 3,773,457 | 11/1973 | Badoux et al. | 425/437 |
| 4,124,352 | 11/1978 | Pasch | 425/444 |
| 4,157,888 | 6/1979 | Sikorski | 425/556 |
| 4,204,824 | 5/1980 | Paradis | 425/444 |
| 4,207,051 | 6/1980 | Wright et al. | 425/444 |
| 4,212,622 | 7/1980 | Kikuchi et al. | 425/444 |
| 4,243,364 | 1/1981 | Rees et al. | 425/444 |

*Primary Examiner*—Willard E. Hoag
*Attorney, Agent, or Firm*—Bachman & LaPointe

[57] ABSTRACT

Apparatus for continuously receiving and collecting molded articles from a continuously cycling injection molding machine where the articles are collected sequentially and continuously in a uniform physical position or orientation.

10 Claims, 7 Drawing Figures

APPARATUS AND METHOD FOR REMOVING MOLDED ARTICLES IN UNIFORM ORIENTATION

BACKGROUND OF THE INVENTION

The present invention relates to injection molding and relates in particular to methods and machinery for recovering and collecting molded articles in continuous fashion.

In modern high speed mass production of molded articles, it is important to maintain rapid molding cycles at uniform rates to maintain product quality.

It is also desirable to recover molded articles quickly with a minimum interference with the mold cycle and without prolonging the cycle time.

In the interest of efficient and economical packaging of the molded articles, it is desirable to receive, recover and collect articles continuously where the disposition of each article or its orientation is uniform.

Articles so received and so arranged lend themselves to high speed automatic packaging machinery and similar processes.

In contrast, where the articles are received or recovered in random fashion, it is frequently necessary to expend a great amount of manual effort to arrange the molded articles into a uniform, orderly orientation before introduction to a packaging station or to other processing operations.

Prior art devices and methods have succeeded in solving this problem but frequently at the expense of prolonging the molding cycle. In addition, such prior art devices are manufactured of close tolerance piece parts which require considerable maintenance and frequent parts' replacement, because the said devices must be accurately positioned to receive molded articles upon ejection.

A prior art apparatus of this class operable to recover molded articles with uniform orientation in continuous fashion is shown and described in U.S. Pat. No. 3,910,740, issued Oct. 7, 1975 to H. Rees, entitled "Injection-Control System for Injection Molding Machine" and assigned on its face to Husky Injection Molding Systems, Ltd.

In the '740 patent and in the embodiment of FIGS. 1–5, a pair of generally parallel rods 22a and 22b are traversed toward and away from a mold cavity in synchronism with the opening and closing of the mold cavity driven by the cam and follower arrangement shown in FIG. 5. When the mold cavity is closed the parallel rods are expanded and are disposed in the position of FIG. 2. Upon opening the mold the elements 22a and 22b are drawn to the edge of the molded article 21 providing a track for guiding the articles downwardly along a vertical path to a convenient receptacle.

In usual and customary fashion, the molded articles are removed from the mold wall 19 by the stripper plate 16.

In the '740 device, mold time is lost while the articles are provided an interval of time to drop vertically by gravity. In addition, frequently the articles hang up in the track and must be advanced or urged along with a jet of air.

SUMMARY OF THE INVENTION

In contrast, the present invention provides a relatively inexpensive simplified apparatus for collecting molded articles in a predetermined orientation in continuous fashion.

The invention also contemplates a simplified receiving member which is movable to and fro in synchronism with the molding cycle with a minimum of interference with the molding cycle.

A further feature of the invention is the provision of an article receiving device which is free of the need for close tolerance piece parts and accurate positioning thereof to receive molded articles.

A still further feature of the invention is the provision of a novel method of removing, receiving and collecting molded articles in continuous fashion where all articles are gathered in the same physical arrangement or orientation.

An apparatus for continuously collecting molded articles from a continuously operating injection molding machine embracing certain principles of the present invention may comprise a pair of relatively movable mold platens each having a mold element cooperating to define at least one mold cavity, means for molding an article in said cavity, means for separating the mold platens so that the molded article is retained on one of the platens, means responsive to motion of one of said platens in a first direction for advancing a receiving plate into the proximity of the molded article, mechanical or fluid pressure means for ejecting the molded article from its mating platen operative to drive the article into contact with the receiving plate, vacuum means cooperating with the receiving plate and in timed relation with respect to the operation of said fluid pressure means effective to retain the article releasably on the plate, said motion responsive means being operable upon motion of said one platen in a second direction to move said receiving plate away from said mold elements so that the molding cycle continues uninterrupted, and means further responsive to motion of said one platen for breaking the vacuum so that the article is free to drop in response to gravity while maintaining a predetermined physical orientation.

A method of removing articles continuously from an injection molding machine embracing certain other principles of the invention may comprise the steps of providing relatively movable mold platens formed with cooperating mold elements defining a mold cavity, molding an article within said cavity, separating the platens whereby the molded article is retained on one platen, placing an article receiving member into proximity of said article, ejecting the article from the platen and driving it into contact with the receiving member, fixing the article on the receiving member, moving the receiving member away from the mold cavity free of the mold platens and releasing the molded article from said receiving member whereby the article is free to drop by gravity sliding along said receiving member in proper orientation to a station for further processing.

BRIEF DESCRIPTION OF THE DRAWINGS

Other features and advantages of the present invention will become more apparent from an examination of the succeeding specification when read in conjunction with the appended drawings in which.

DETAILED DESCRIPTION OF THE INVENTION

Figure 1:
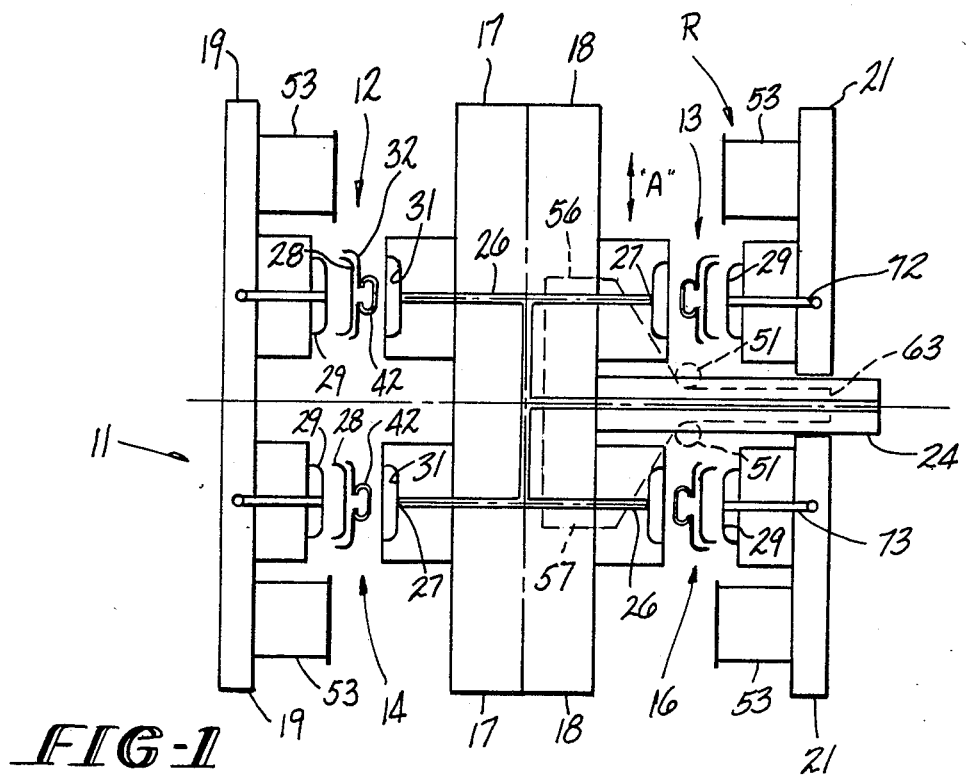
FIG. 1 is a plan view of a stack or tiered injection molding set with a pair of fixed platens back-to-back and showing the mold cavities in the open condition.
Figure 2:
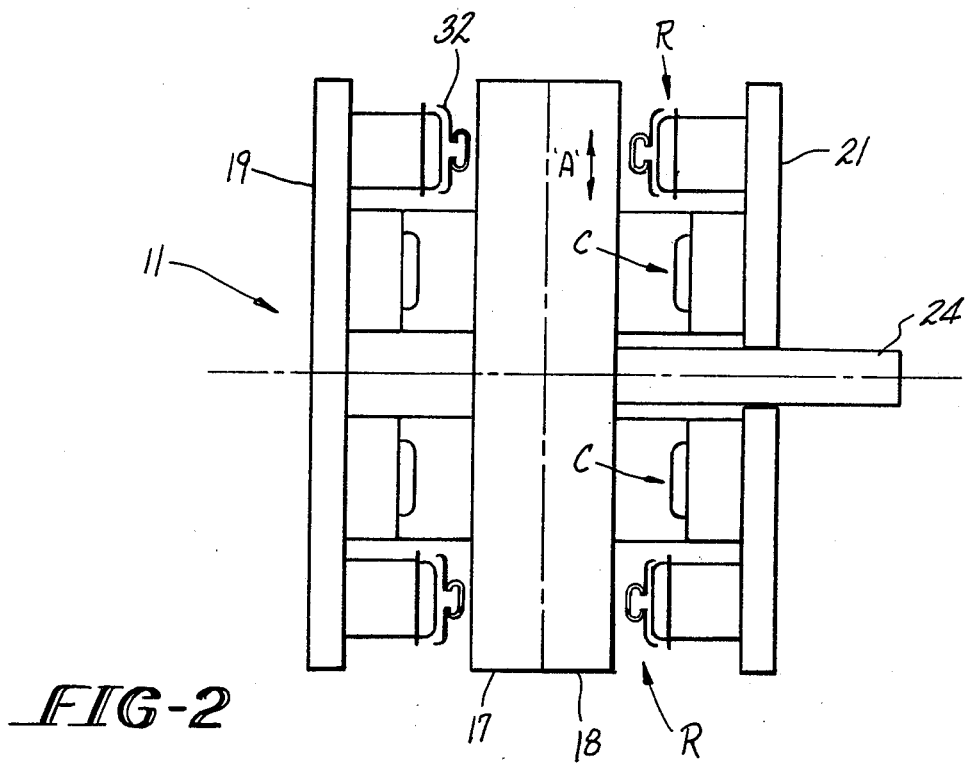
FIG. 2 is a view similar to FIG. 1 showing the mold cavities in the closed position.

In FIGS. 1 and 2 the reference numeral 11 designates the top tier of a two-tier or stack mold set. FIG. 1 shows the open condition and FIG. 2 shows the closed condition.

The arrangement is shown schematically and certain top portions are removed to facilitate explaining the principles of the invention.

In some cases only one structure of a pair of structures will be described in detail with the understanding that one structure is identical to the other or is in opposite hand or mirror image thereof.

For example, the mold set 11 is one set of a stack or two-tier set, i.e. one set 11 is positioned directly above the other. (Only the top mold set is shown in FIGS. 1 and 2).

Further, the reference numerals 12 and 13 and 14 and 16 designate generally pairs of molded article receiving devices which are of identical structure; however, the devices 12 and 13 are of opposite hand relative to the devices 14 and 16, respectively.

FIGS. 1 and 2 show a fixed mold platen 21 cooperating with relatively movable platens 17, 18 and 19.

The reference numeral 24 designates a sprue bar leading from an injection molding machine (not shown) delivering molding compound to a mold cavity via usual and customary runners and gates indicated by the reference numerals 26 and 27, respectively.

The mold for a molded article 28 (FIG. 1) is composed of a mold element or core 29 carried by movable platen 19 and cavity 31 supported by cooperating movable platen 17.

The reference numeral 32 designates, schematically a specific molded article receiving device which in FIG. 1 is shown in its operative or molded article receiving position.

For purposes of subsequent claiming this invention this position of the receiving device 32 may be described as its second or receiving position and the position of the device in FIG. 2 its first position or release position.

The article receiving device 32 is movable to and fro laterally as indicated by the arrow labelled A by a transfer means in a manner and by means which will become more apparent as the specification proceeds, from the position of FIG. 1 to the position of FIG. 2 carrying along a newly molded article 28.

As is apparent in FIGS. 2, 3 and 4 the molded article receiving device 32 moves into register with a fixed chute member 34 which forms a continuation of the article receiving device effective to dispense molded articles in a manner which will be explained in greater detail in connection with FIGS. 5, 6 and 7.

It is to be particularly noted that the article receiving device 32 withdraws from the mold area clutching the newly molded article 28 in positive fashion thus clearing the mold set for prompt closure with little or no delay in its repetitive cycle.

Figure 5:
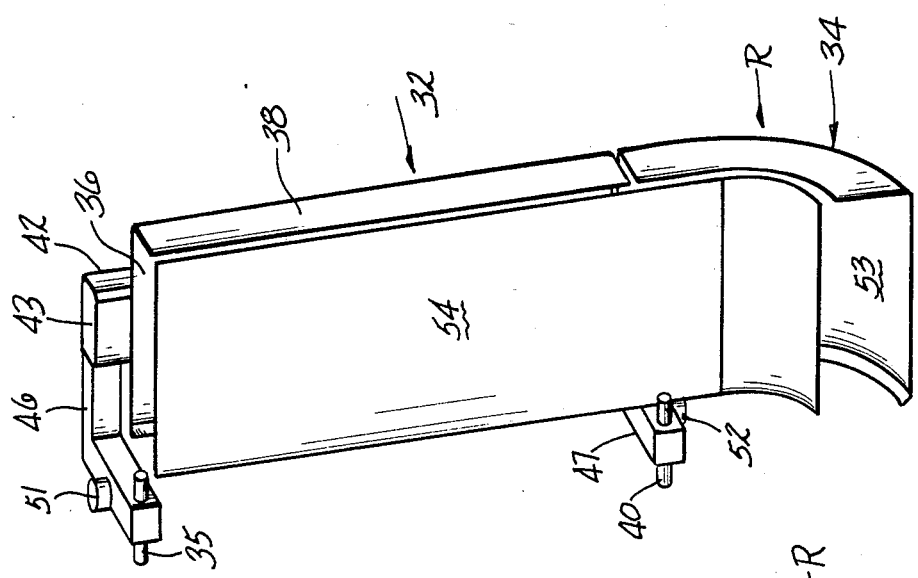
FIG. 5 shows the receiving device in register with the chute and cover plate.
Figure 4:
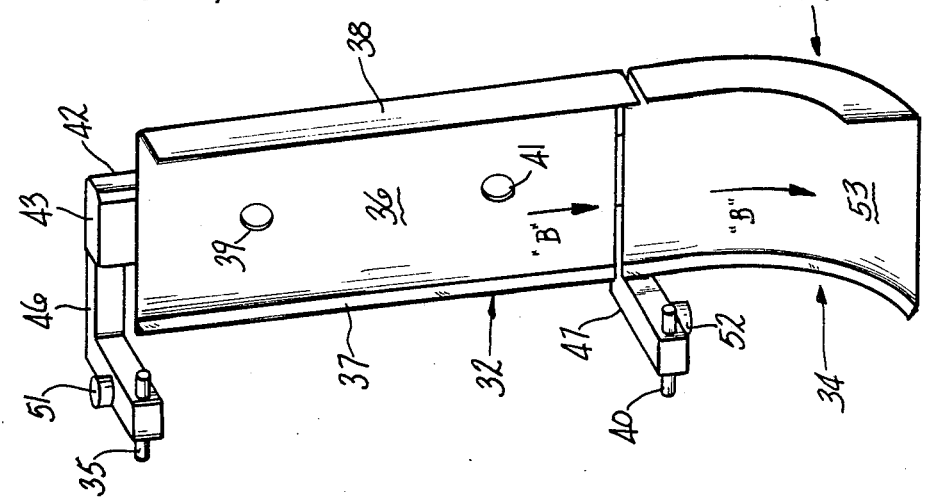
FIG. 4 is a view similar to FIG. 3 showing the receiving device in register with the chute.
Figure 3:
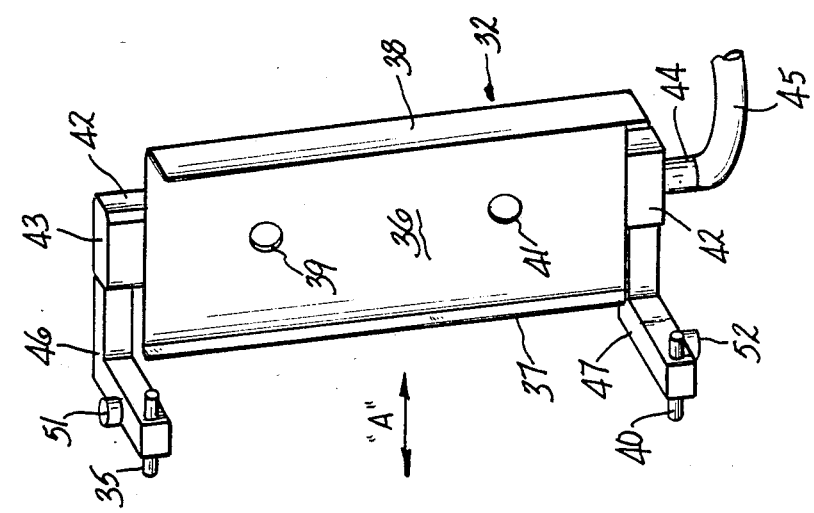
FIG. 3 is a perspective view of a portion of the article receiving device.

Turning now to FIGS. 3, 4 and 5 details of the article receiving device 32 will be described. Only one device will be described with the understanding that all the receiving devices indicated generally at 12, 13, 14 and 16 in FIGS. 1 and 2 are of similar structure but exist in pairs of opposite hand.

The device 32 includes a vertical back plate or receiving plate 36 bounded by sidewalls 37 and 38. The back plate is formed with two apertures 39 and 41 whose vertical spacing is dictated by the vertical spacing of mold cavities of the top and bottom mold sets of the two-tiered stack mold of FIGS. 1 and 2.

That is, the receiving plate 36 is positioned in elevation at a point relative to the two-tiered mold set so that the apertures 39 and 41 fall into register with respective mold cavities of each tier, i.e. aperture 39 registers with mold core 29 and mold cavity 31 in the top tier mold set of FIG. 1 and aperture 41 falls into register with the mold elements of the lower tier directly below.

Apertures 39 and 41 communicate with a channel 42 secured to the back side of receiving plate 36 closed at its upper end by a plate 43 and terminating at its lower end in a fluid tight fitting 44 connected to a flexible tube 45 leading to a source of vacuum.

The article receiving device 32 is supported by top and bottom angle brackets 46 and 47 which receive top and bottom guides or aligning rods 35 and 40, along which the receiving device 32 reciprocates and is supported moving to and fro from the article receiving position in FIG. 1 to the release position of FIG. 2.

Figure 6:
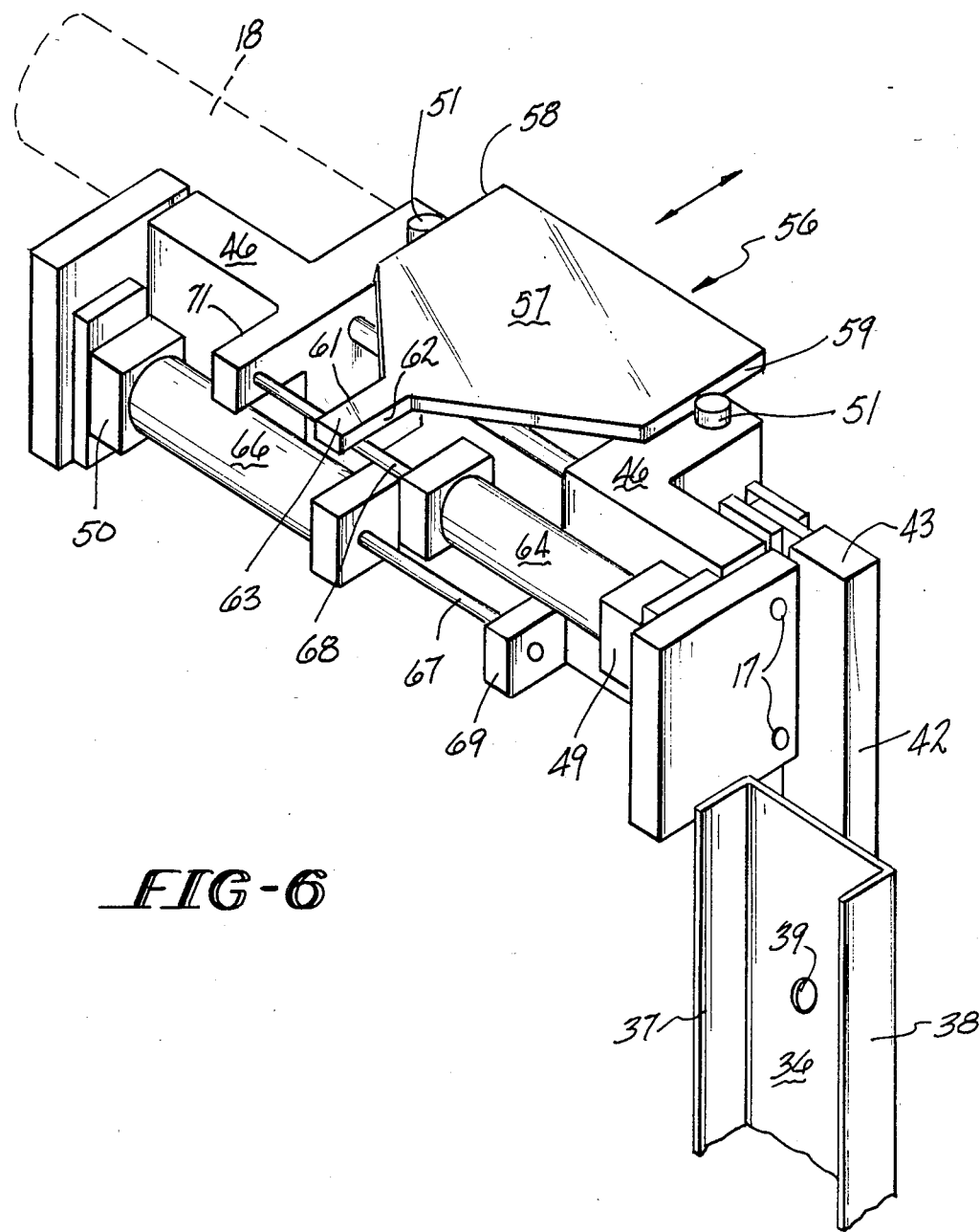
FIG. 6 is a perspective view of the mechanism for driving the receiving devices.
Figure 7:
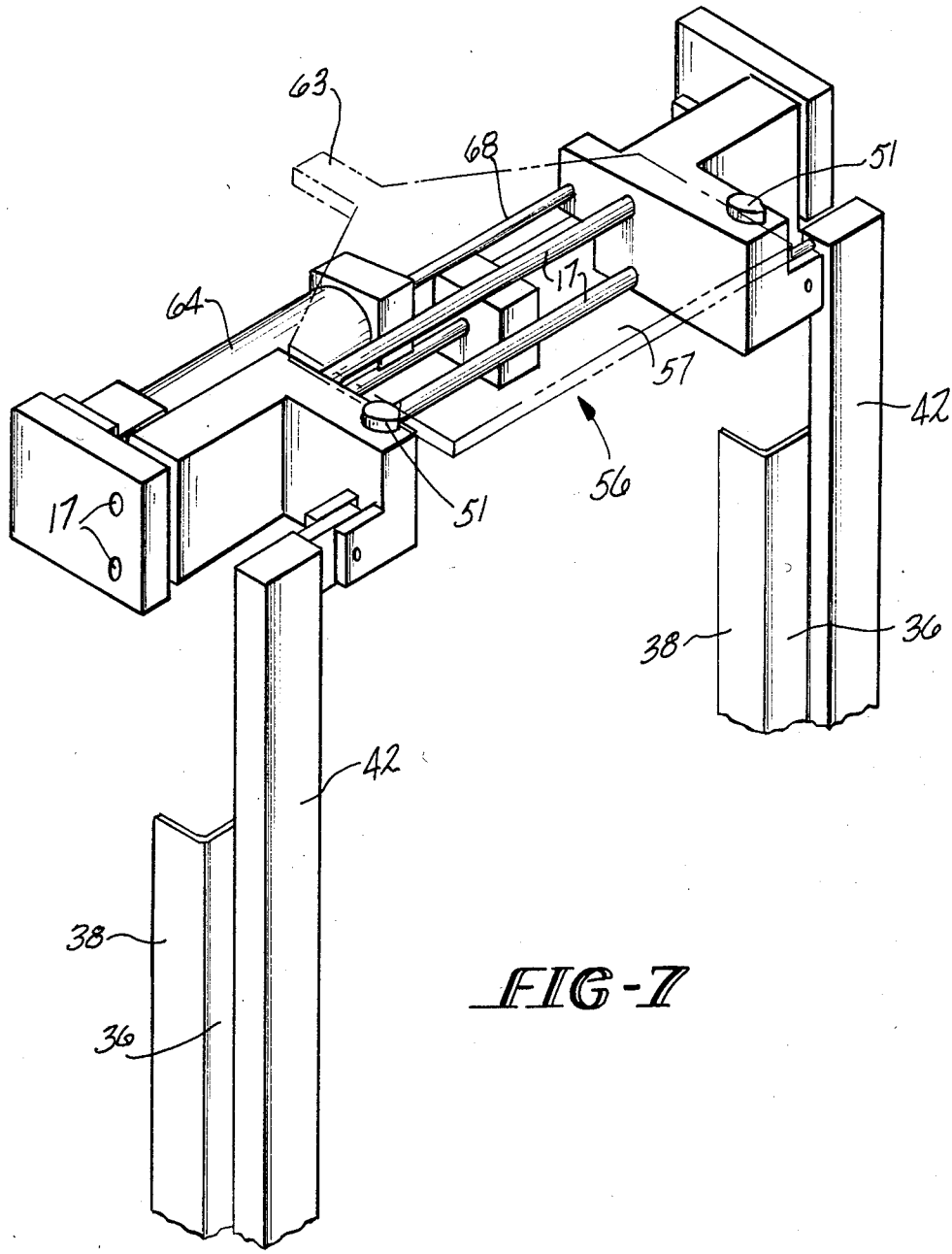
FIG. 7 is a view similar to FIG. 6 illustrating the back side of the driving mechanism.

Referring to FIGS. 6 and 7 it is apparent that the rods 35 and 40 are supported at their extremities in spaced blocks 49 and 50 in turn secured to the platen supporting the core side of the mold, such as platens 19 and 21, in any suitable fashion such as by machine screws.

Note that each bracket 46 and 47 carries a projecting cam follower 51 and 52, respectively, which engage mating top and bottom (only top cam shown) cam plates secured to the cavity side of the mold such as to platens 17 and 18 so that the cooperation between the cam plates and followers operates to move the article receiving plates 32 to and fro as the die set opens and closes in a manner that will be more apparent shortly.

As is apparent in FIGS. 1, 2, 4 and 5 core platens such as the platen 19 and 21 (FIG. 1) support a curved slide or chute 53 fixed to the platen in the article release position as indicated by the letter R. The chute 53 is dimensioned in horizontal cross-section to match the corresponding cross-section of the receiving device 32 and one chute 53 is provided for each receiving device so that when the device is in the release position R the chute and the article receiving device are in register providing a transition from a vertical slide to a horizontal slide.

The vertical article receiving device 32 and the contiguous chute 53 are provided with a cover plate 54 fixed at the release position to keep molded articles from tumbling.

Referring to FIGS. 1, 6 and 7 the cam and follower arrangement will be described. A paddle shaped cam 56 having a body 57 with parallel cam tracks 58 and 59 terminating in cam tracks 61 and 62 is secured by bolting body 57 to a central position on a cavity platen 18 such as indicated in dotted lines in FIG. 1.

Hydraulic or pneumatic cylinders 64 and 66 supported by fixed blocks 49 and 50 have piston rods 67 and 68, respectively connected to wings 69 and 71 of angle brackets are operative to maintain a load on the angle brackets 46-46 tending to draw the brackets together along their guide rods into contact with the cam tracks.

Since the followers 51 (top) and 52 (bottom) are carried by the angle brackets 46 (top) and 47 (bottom) which in turn are slidably supported on the guide rods 35-35 the pistons operate to keep the followers snugly in contact with their respective cam tracks.

In the paired (top and bottom) angle bracket arrangement shown in FIGS. 3, 4 and 5 vertical alignment of the article receiving devices (as they travel from station to station) is maintained by providing a cam-follower set at the top and at the bottom of the tiered or stack mold set. Only the complete top set is shown.

Operation

With the mold cavity C in the closed condition (FIG. 2) and the article receiving device 32 in its article release position R the followers 51-51 are in the position shown in FIGS. 6 and 7.

In timed sequence the movable platen 18 moves from the closed position of FIG. 2 to the open position of FIG. 1 and a molded article is retained on the core 29.

Movable platens 17 and 18 move in unison for a partial stroke along with movable platen 19. Platens 17 and 18 are arrested and platen 19 continues its stroke until its molds open. Platen 21 remains fixed at all times.

During the course of opening the mold cavity followers 51-51 follow their respective cam tracks 58-59 and 61-62 permitting pistons 64 and 66 to draw a pair of article receiving devices 32-32 into the proximity of the stacked cores 29-29.

A blast of air is applied through channels 72 and 73 ejecting the newly molded articles into contact with receiving plate 36 in the region of and into the proximity of plate apertures 39 and 41.

Simultaneously a vacuum is drawn through conduit 45, channel 42 and apertures 39 and 41 effective to retain the molded articles releasably in the position shown in FIG. 1.

While maintaining the vacuum the molding cycle continues and the mold elements 27 and 29 are returned to their closed cavity position of FIG. 2.

During this occurrence cam and following action in opposition to pushers 64 and 66 drives the article receiving devices 32-32 apart to their respective article release positions R as shown in FIG. 2.

When the receiving devices are in register with their mating chutes 53-53 the vacuum is broken and the articles are released and slide neatly down and out the chute to the next process station; each and every article discharging in the same physical disposition or same orientation relative to the orientation of every other article.

Method

The method of the invention involves the provision of a continuously cycling injection mold set of one or more mold cavities of single or multiple tier (stack) arrangement where it is desired to mold, collect and discharge molded articles in accord with a uniform physical orientation.

Assuming that an article has been molded the die or mold elements forming the mold cavity are separated and during the course of this occurrence a collector member is moved into register with the molded article. The article is then blown off the die element to which it clings and simultaneously a vacuum is applied to the collector member to secure the molded articles releasably to the collector member. Without hesitation the die elements cycle to a closed position and during this occurrence the collector member moves clear of the die elements to an article release station. At the release station the vacuum is broken and the article is free to follow a restricted path in response to gravity where the article and each succeeding article is deposited in said uniform physical orientation.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In an injection molding apparatus for continuously molding articles including a pair of relatively movable mold platens, each platen supporting a mold element cooperating to define a mold cavity, said platens cycling continuously through a cavity opening stroke and a cavity closing stroke, an improved device for receiving and dispensing molded articles in a uniform physical orientation comprising:

a receiving means carried by one of said platens, said receiving means being movable from a first position defining a release position to a second position defining a receiving position in proximity to a molded article retained on one of said platens, and a transfer means carried by said one platen responsive to relative motion between said platens for driving said receiving plate from said first position to said second position, said receiving means being but a single elongated channel having a predetermined cross-section mating with a chute having a similar cross-section.

2. The apparatus of claim 1 in which one platen is fixed and the other platen is movable and the receiving plate is carried by the movable platen.

3. The apparatus of claim 1 in which one platen is fixed and the other platen is movable and the transfer means is carried by the movable platen.

4. The device of claim 1 in which one platen is fixed and the other platen is movable and the receiving means and the transfer means are both carried by the movable platen.

5. The device of claim 4 in which the transfer means includes at least one cam follower on the fixed platen cooperating with a cam fixed to said movable platen.

6. The device of claim 5 including fluid means for urging the cam follower into firm contact with said cam.

7. The apparatus of claim 1 in which said movable platen supports a chute device fixed at said release position, said chute providing a continuation of said receiving plate when said means is in the release position.

8. The device of claim 7 in which said receiving means is formed with an aperture and a communicating channel leading to a source of vacuum, said aperture in the proximity of a molded article when said receiving means is in said second or receiving position whereby a molded article thrust upon the receiving means is retained by vacuum applied through said aperture.

9. The device of claim 7 in which said movable platen supports a cover plate fixed at said release position in register with said chute which cooperates with said receiving plate at said release position to keep articles from tumbling.

10. The device of claim 7 in which said chute defines a first path generally parallel to said receiving plate curving to a second path generally perpendicular to said first path.

* * * * *

UNITED STATES PATENT AND TRADEMARK OFFICE
CERTIFICATE OF CORRECTION

PATENT NO. : 4,589,840

DATED : May 20, 1986

INVENTOR(S) : ROBERT D. SCHAD

It is certified that error appears in the above-identified patent and that said Letters Patent is hereby corrected as shown below:

Column 6, claim 1, line 29, change "plate" to --means--.

Column 6, claim 2, line 35, change "plate" to --means--.

Column 6, claim 7, line 52, change "plate" to --means--.

Column 6, claim 9, line 62, change "plate" to --means--.

Column 6, claim 10, line 65, change "plate" to --means--.

Signed and Sealed this

Twenty-fourth Day of February, 1987

*Attest:*

DONALD J. QUIGG

*Attesting Officer*     *Commissioner of Patents and Trademarks*